United States Patent [19]
Luther et al.

[11] Patent Number: 5,867,621
[45] Date of Patent: Feb. 2, 1999

[54] ADAPTER AND GUIDE PIN ASSEMBLY FOR COUPLING OF FIBER OPTIC CONNECTORS

[75] Inventors: James P. Luther; Terry L. Cooke; Dennis M. Knecht; Joel C. Rosson; Markus A. Giebel; David L. Dean, all of Hickory, N.C.

[73] Assignee: Siecor Corporation, Hickory, N.C.

[21] Appl. No.: 842,126

[22] Filed: Apr. 23, 1997

[51] Int. Cl.⁶ .................................................. G02B 6/38
[52] U.S. Cl. .............................................. 385/59; 385/60
[58] Field of Search ................................ 385/56, 58, 59, 385/60, 65, 78, 83

[56] References Cited

U.S. PATENT DOCUMENTS 5,542,015  7/1996  Hultermans ............................. 385/60
5,737,463  4/1998  Weiss et al. ............................. 385/59

FOREIGN PATENT DOCUMENTS 61-61111  3/1986  Japan.
62-69213  3/1987  Japan.

Primary Examiner—John Ngo

[57] ABSTRACT

An adapter is provided for operatively mating two optical fiber connectors of the type that are aligned relative to each other by guide pins. The adapter has two sleeve body halves that are joined together at a mating ends. A guide pin mount is captured between the two sleeve body halves that defines an opening to allow abutment of the two connectors therethrough. Two guide pins mounted on the guide pin mount parallel with the passageway defined through the sleeve and located so as to engage the guide pin holes on the connectors and align two connectors inserted into the adapter.

11 Claims, 4 Drawing Sheets

ADAPTER AND GUIDE PIN ASSEMBLY FOR COUPLING OF FIBER OPTIC CONNECTORS

TECHNICAL FIELD OF THE INVENTION

The present invention relates to adapters used for mating two fiber optic connectors of the type that use guide pins to align the end faces of the two connectors relative to each other.

BACKGROUND OF THE INVENTION

Joining of optical ribbon fiber with connectors is conventionally achieved with multi-fiber ferrules either spring clipped together or incorporated into push-pull connectors and mating the connectors in an adapter. U.S. Pat. No. 5,214,730 shows several versions of spring-clipped ferrules as well as connector and adapter assemblies. Ribbon fiber is gaining wider acceptance in applications that require the ease of connect and disconnect offered by the connector and adapter format as compared to the spring clip format.

The multi-fiber ferrules, in both the spring clip and connector applications, use a pair of guide pin holes flanking the array of fibers and guide pins to align the end faces of the ferrules so that the opposing arrays of fibers are aligned. While the use of guide pin holes and guide pins has proven to align opposing ferrules very precisely, they are extremely tedious and troublesome to use. Initial insertion of the pins into the ferrule faces is painstaking and pins commonly fall out of the ferrules. The drawbacks of the guide pins are heightened even further in the connector and adapter application because the second connector to be inserted is inserted blind and a guide pin and guide pin hole may not line up due to slight variations in adapter and connector dimensions from part to part. Also, connectors are typically connected and disconnected frequently and guide pins may fall out. Another concern with guide pins is that a pair of connectors may be mated with less than both guide pins due to craft inadvertence or lack of training and the fibers would most likely not be aligned. Yet another concern is whether to always have one guide pin per one connector or have two guide pins in half of the connectors and none in the other half. With either option there is potential for guide pins to be transferred from one connector to the other when the connectors are disconnected. This renders that connector out of conformance with whatever guide pin scheme has been adopted. Moreover, in some applications, one of the connectors remains in the adapter and the other side of the adapter receives different connectors. The adapter acts as a shroud to the stationary protector making it impractical to see the status of the guide pins on its end face. Another drawback is the cleaning of the connector end faces. With guide pins in the connector, they must be removed before the end face can be properly cleaned.

Therefore a need exists for a connector and adapter arrangement which takes advantage of the preciseness of the guide pins' alignment yet eliminates the various drawbacks associated with guide pins.

SUMMARY OF THE INVENTION

The present invention eliminates the drawbacks associated with inserting guide pins into MTP connectors by moving the guide pins into the adapter. In one aspect of the present invention, a guide pin mount is captured between two sleeve body halves which are joined together to form the adapter. Each sleeve body half has a free end through which a connector is insertable and a mating end opposite thereto. A passageway is defined therethrough from the free end to the mating end. The two sleeve body halves are joined to each other at the mating ends so as to align the passageways with a common longitudinal axis.

The adapter has a guide pin mount disposed between the mating ends of the sleeve body halves. The guide pin mount defines an opening so as not to obstruct the mating of opposed end faces of connectors therethrough. At least two guide pins are mounted on the guide pin mount and extend from each side of the guide pin mount in a direction parallel with the passageway such that the ends of the guide pins will be received by the guide pin receiving geometries of the optical fiber connectors when the two optical fiber connectors are inserted into the adapter.

Another aspect of the present invention is the combination of the connectors with the adapter as an assembly. Yet another aspect of the invention is the guide pin mount used with only one sleeve body half that is attached to a component capturing the guide pin mount therebetween.

By having the guide pins permanently in the adapter, all the drawbacks associated with the guide pins in the connectors are eliminated. All adapters are made with the guide pins and all connectors are made without guide pins. The connectors can then be readily manufactured, cleaned and polished without concern for the interference of the guide pins. Additionally, by placing the guide pins on a guide pin mount that is captured between two sleeve body halves, conventional connector sleeves can be readily adapted to accommodate such a guide pin mount and there is no need to deviate from industry conventions with respect to other aspects of the adapter.

DETAILED DESCRIPTION OF THE PREFERRED EMBODIMENT

Figure 1:
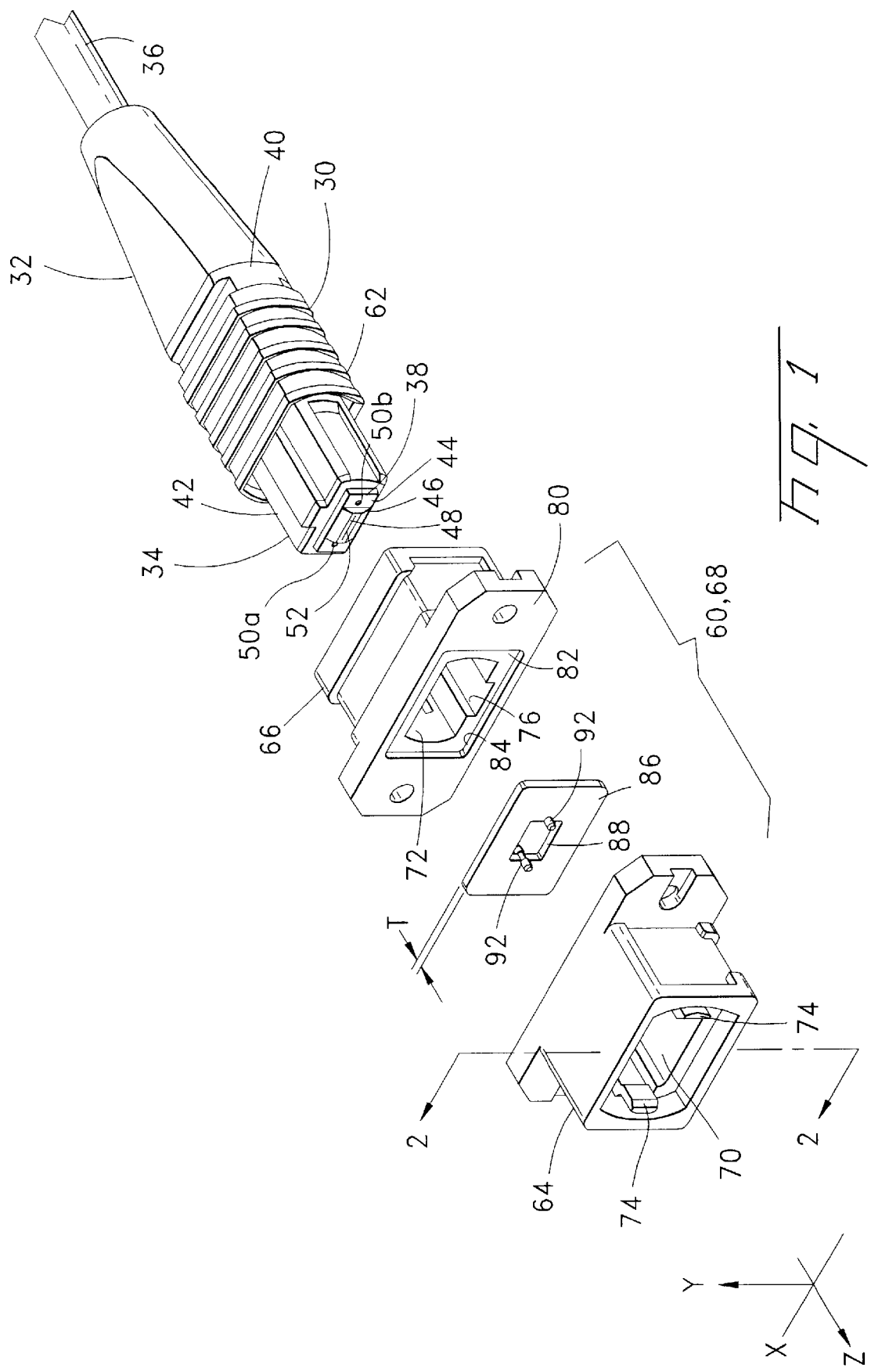
FIG. 1 is an exploded perspective view of an adapter of the present invention with a multi-fiber connector shown therewith.

With reference to FIG. 1, optical fiber connector 40 is shown disposed for insertion in the preferred embodiment of adapter 60 of the present invention. Connector 30 is a type of conventional connector known by the acronym of "MTP." U.S. Pat. No. 5,214,730 to Nagasawa et al. shows other types of MTP connectors, see FIGS. 9–11 and 26–30 therein, as well as describes a variety of multi-fiber ferrules that are used in such connectors. Connector 30 has fiber end 32 and ferrule end 34 opposite thereto. Ribbon fiber 36 enters fiber end 32 and the individual fibers are fed into ferrule 38 as is known (e.g., Nagasawa). Connector 30 has outer body 40 that slides over inner body 42. Outer body is grasped by fingers to push-pull connector 30 into engagement with an adapter.

Ferrule 38 is located in inner body 42 and has large end face 44 and stepped portion 46 which has small end face 48.

Ferrule 38 defines two guide pin holes 50a, b that open through large end face 44 and a row 52 of fiber holes that open through small end face 48 of stepped portion 46. The height of stepped portion 46 will be defined as the distance from small end face 48 to large end face 44. If small end face 48 is angled or curved, then the distance would be from the line on small end face 48 that bisects row 52 of fiber holes to large end face 44.

Figure 2:
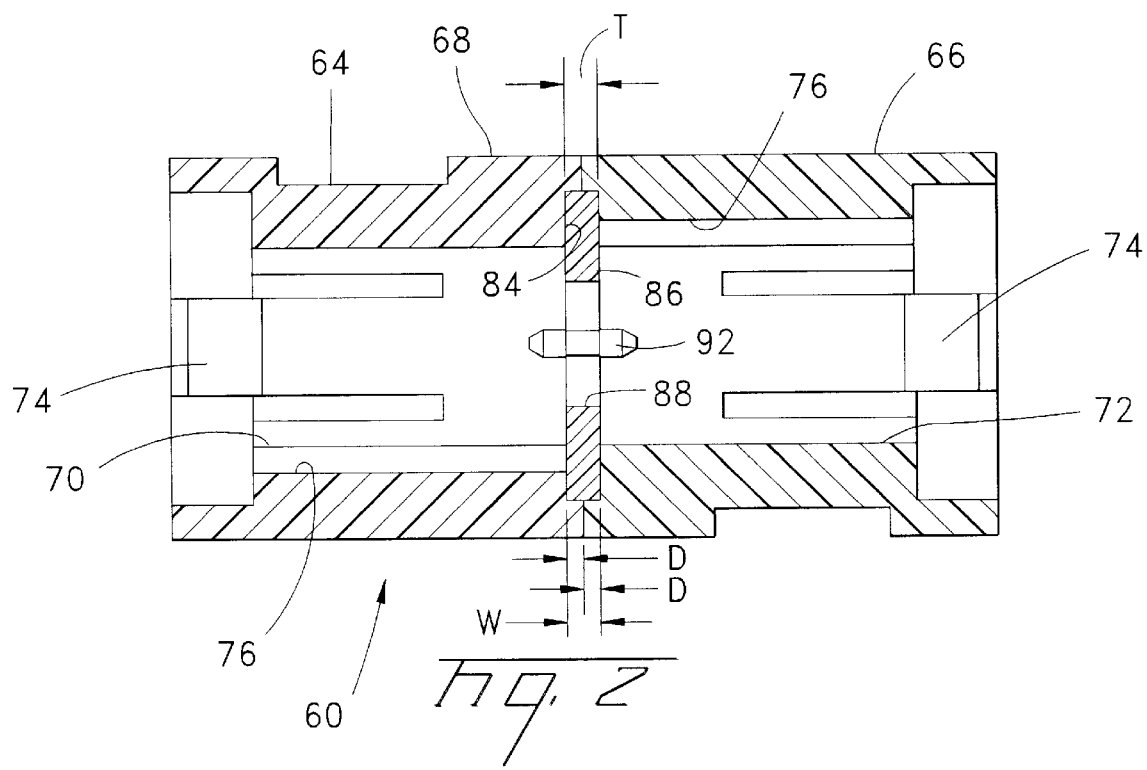
FIG. 2 is a cross-section along line 2—2 of the assembled adapter shown exploded in FIG. 1.

With reference to FIGS. 1–2, adapter 60 has two sleeve body halves 64, 66 which are attached together as is known in the art to create unitary sleeve body 68. Each sleeve body half 64, 66 defines sockets 70, 72, respectively, which are sized to receive industry standard MTP optical fiber connectors in an operative coupled relationship. Each socket has latch arms 74 and key way 76 just as in prior art sleeves. The outer dimensions of sleeve body 68, the size of the entry into sockets 70, 72 and the configuration of latch arms 74 are generally the same as industry standard adapters.

Each sleeve body half 64, 66 has mating surface 80 which abuts with mating surface 80 of the other sleeve body half when unitary sleeve 68 is formed. The preferred embodiment of the present invention provides shoulder 82 recessed into mating surface 80 by depth D so that cavity 84 is formed between opposing shoulders 82 with a width W of twice D when sleeve body halves 64, 66 are attached together.

Before assembly of adapter 60, guide pin mount 86 is disposed against shoulder 82 of one of the sleeve body halves and then the sleeve body halves are assembled thereby capturing guide pin mount 86 in cavity 84 between opposing shoulders 82. Guide pin mount 86 in the preferred embodiment is generally planar and sized to generally correspond to the extent of shoulder 82. Mount 86 is preferably made of metal, preferably nickel, by x-ray lithographic techniques to achieve the appropriate precision. Mount 86 can also be made of other suitable materials, for example, stainless steel. Current parts are machined and jig ground. Guide pin mount 86 defines opening 88 to allow end face abutment of the connectors therethrough. As such, opening 88 must be at least slightly larger than small end face 48 of stepped portion 46 on ferrule 38. Guide pin mount has thickness T that is generally equal to or less than twice the height of stepped portion 46 of connector 30. If thickness T of guide pin mount is too much greater than twice the height of stepped portion 46, small end faces 48 of two opposing connectors 30 may be prevented from being abutted in face to face contact as is typically required for optical connector ferrules. When two connectors 30 are mated in adapter 60, small end faces 48 will abut generally at a point within opening 88 of guide pin mount 86.

Thickness T of guide pin mount 86 is preferably slightly less than width W of cavity 84 so that guide pin mount 86 can float in cavity 84 along the z-axis as well as cock at a slight angle within cavity 84 to help accommodate variances in connector and sleeve dimensions as guide pins 92 seek guide pin holes 50a, b during insertion of connectors 30 in adapter 60.

Figure 3:
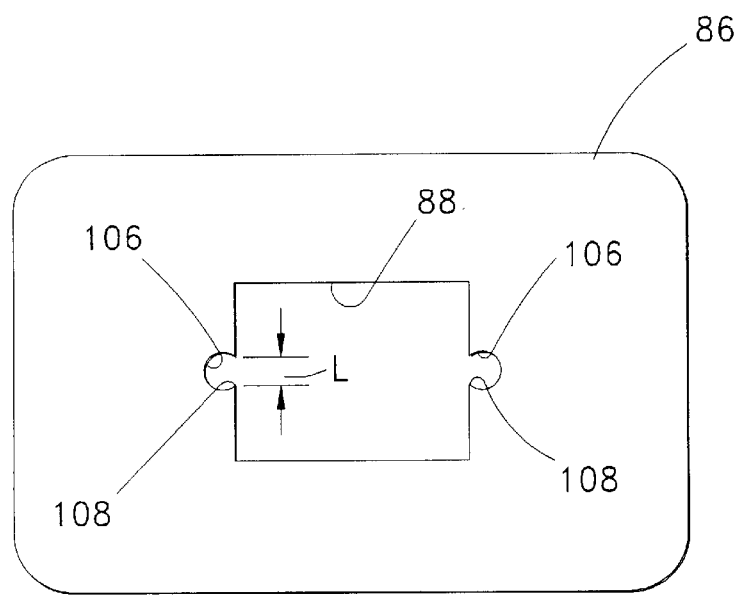
FIG. 3 is a front view of the preferred embodiment of the guide pin mount used in the present invention.
Figure 4:
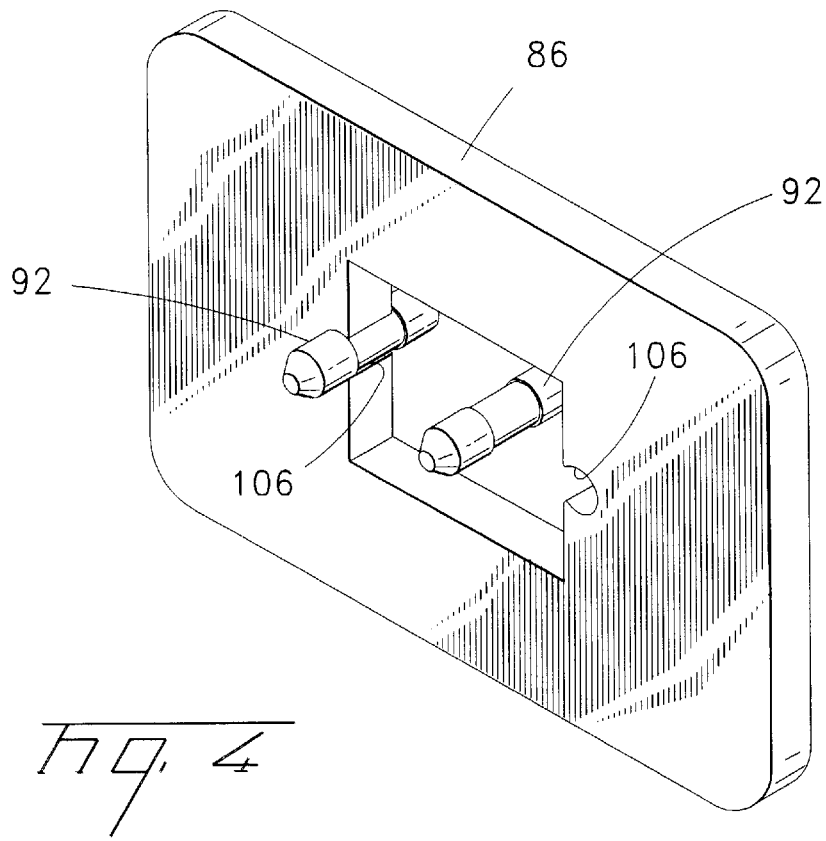
FIG. 4 is a perspective view of the preferred embodiment of the guide pins and guide pin mount used in the present invention with one guide pin exploded.
Figure 5:
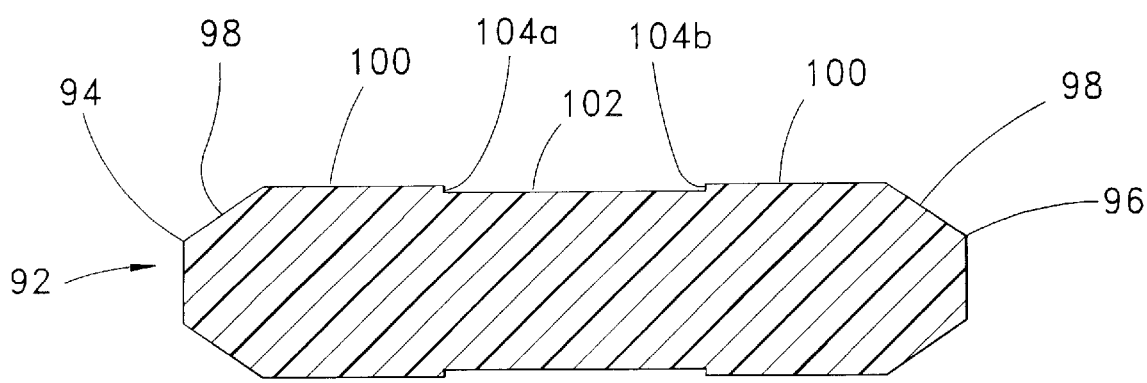
FIG. 5 is a cross-section of the preferred embodiment of the guide pin of the present invention.

With further reference to FIGS. 3–5, guide pins 92 are mounted to guide pin mount 86 and extend into sockets 70, 72. Guide pins 92 have first end 94 and second end 96 opposite thereto. Guide pin 92 has a circular cross-section that changes in diameter along the length of guide pin 92. Specifically, guide pin 92 has tapered portion 98 at each end that tapers radially inward toward the ends of the guide pin. Tapered portions 98 contributes to guide pins 192 finding guide pin holes 50a, b.

Longitudinally inward from each tapered portion 98 is a guide portion 100 that has a diameter slightly larger than the diameter of guide pin holes 50a, b such that there is a slight interference fit of the pin within guide pin holes 50a, b. The diameter of guide portion 100 as well as the location of guide pins 92 relative to each other is dictated by industry standards. The two guide portions 100 are disposed on opposite sides of guide pin mount 86 when the guide pin is inserted into the mount. Between the two guide portions 100 is snap portion 102. Snap portion 102 has a slightly smaller diameter than the two guide portions 100 thereby defining opposed shoulders 104 a, b.

Snap portion 102 of guide pin 92 is snapped into partial circle cut-outs 106. The circular portion of cut-outs 106 constitutes about 200–300 degrees of a circle and gap 108 with length L opening into opening 88. The diameter of snap portion 102 is slightly larger than length L of gap 108 so that guide pin 92 must be interference snap fit through gap 108. The diameter of snap portion 102 of guide pin 92 is slightly less than the diameter of cut-out 106 to allow for slight angular cocking of guide pin 92 relative to guide pin mount 86 which also contributes to guide pins 92 finding guide pin holes 50a, b during insertion of connectors 30 in adapter 60.

The distance between opposed shoulders 104a, b on guide pin 92 is slightly greater than thickness T of guide pin mount 86 to allow for some float of pins 92 in cut-out 106 in the z-axis as well as accommodate any angular cocking of guide pin 92 within cut-out 106. The various floating fits of components of the present invention are allowable because the crucial alignment mechanism of two opposed connectors is the relative locations of guide pin holes 50a, b on large end face 44. As long as ends 94 and 96 of guide pin 93 find the guide pin holes in opposed large end faces, the connectors will align with each other. Therefore, float is helpful in insuring that the pins will find the guide pin holes despite slight variances in dimensions from connector to connector.

Figure 6:
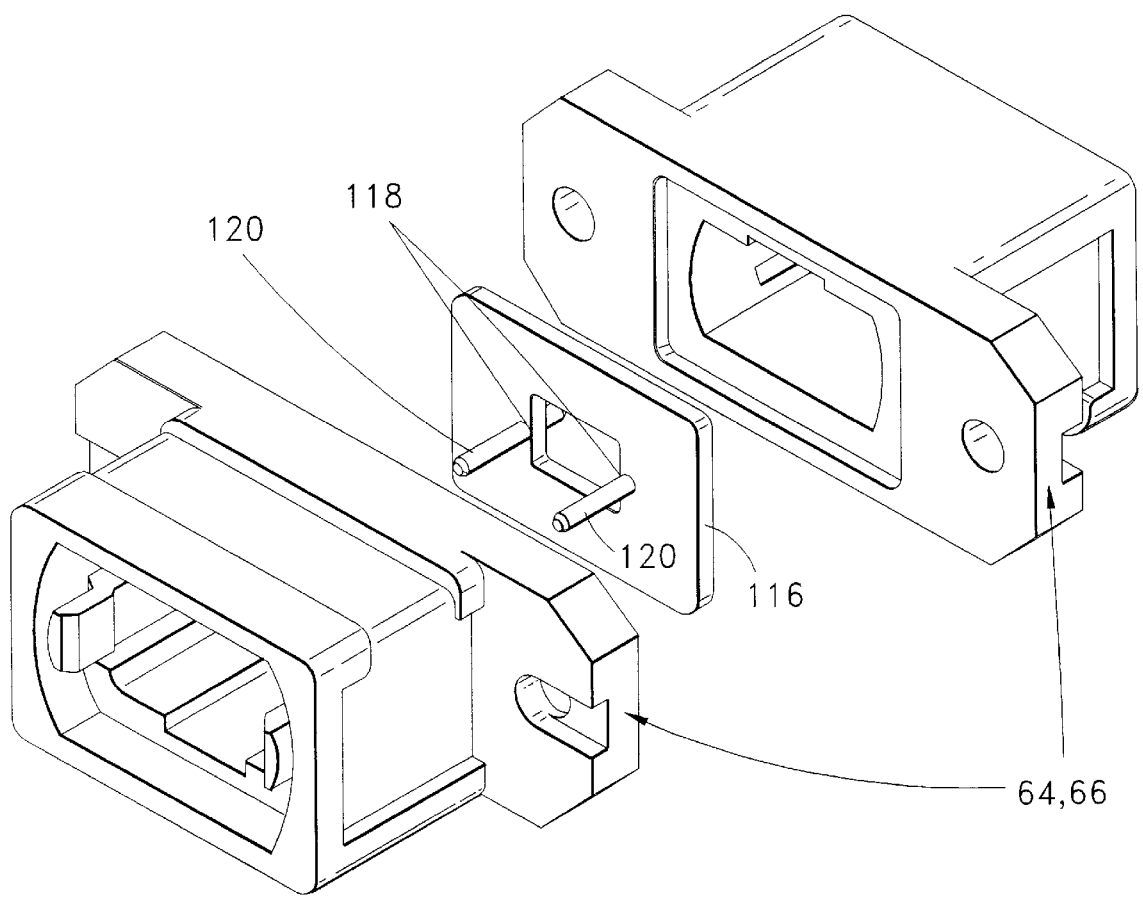
FIG. 6 is a perspective view of an alternative embodiment of a guide pin mount for use in the present invention.

With reference to FIG. 6, an alternative embodiment of the guide pin mount and is shown. In this embodiment, guide pin mount 116 has a pair of circular holes 118 therethrough to receive guide pins 120 that has a constant cross-section between tapered ends, that is, there is no reduced diameter snap portion. In such embodiment, the pins are inserted through holes 118 and then are secured in place by suitable means, for example, welding.

Although the present invention has been described with respect to certain embodiments, various changes, substitutions and modifications may be suggested to one skilled in the art and it is intended that the present invention encompass such changes, substitutions and modifications as fall within the scope of the appended claims.

We claim:

1. An adapter for removably receiving two optical fiber connectors in an operative coupled relationship, each connector having a ferrule that contains at least one optical fiber that terminates at an end face of the ferrule, the ferrule defining at least two guide pin receiving geometries precisely located relative to the at least one optical fiber, the adapter comprising:

(a) two sleeve body halves joined together, each sleeve body half having a free end through which a connector is insertable and a mating end opposite thereto and defining a passageway therethrough from the free end to the mating end, the two sleeve body halves joined to each other at the mating ends so as to align the passageways with a common longitudinal axis;

(b) a guide pin mount disposed between the mating ends of the sleeve body halves, the guide pin mount defining an opening so as not to obstruct the mating of opposed end faces of connectors therethrough; and (c) at least two guide pins mounted on the guide pin mount and extending from each side of the guide pin mount in a direction parallel with the passageway such that the ends of the guide pins will be received by the guide pin receiving geometries of the optical fiber connectors when the two optical fiber connectors are inserted into the adapter.

2. The adapter of claim 1 wherein the mating end has a mating surface generally perpendicular to the longitudinal axis of the sleeve half, the mating surface having a shoulder recessed therefrom, and wherein the two sleeve body halves are joined to each other at the mating surfaces whereby a cavity is defined between the two opposed shoulder surfaces of the sleeve halves, and wherein a portion of the guide pin mount is captured in the cavity.

3. The adapter of claim 2 wherein the guide pin mount can float within the cavity.

4. The adapter of claim 3 wherein the guide pin mount is generally planar and defines cut-outs that open to the opening and that are in the shape of a partial circle of between 200 and 300 degrees thereby defining a gap that opens to the opening of the guide pin mount that is less than the diameter of the partial circle, and wherein the guide pins are located through the cut-outs.

5. The adapter of claim 4 wherein the guide pin has a reduced diameter along a mid portion of its length that is disposed through the cut-out and has a diameter that is greater than the length of the gap but less than the diameter of the partial circle.

6. The adapter of claim 5 wherein the guide pins have an opposing pair of shoulders that steps radially inward to define the reduced diameter portion, the distance between the shoulders slightly larger than the thickness of the guide pin mount around the cut-outs.

7. The adapter of claim 3 wherein the guide pin mount is generally planar and defines holes on opposite sides of the opening for receiving the guide pins therethrough.

8. The adapter of claim 1 wherein each sleeve half has at least two latching arms in each of the sockets for removably retaining a connector.

9. The adapter of claim 4 further comprising two optical fiber connectors inserted in the sockets, each connector having a ferrule with a large end face and a stepped portion extending from the large end face and ending at a small end face, the connectors having at least one fiber terminating at the small end face, the stepped portions of the connectors abutting each other at a point in the opening of the guide pin mount and the large end face of each connector being spaced from the guide pin mount in a longitudinal direction.

10. A adapter and connector assembly, comprising:
 (a) two optical fiber connectors, each connector having a ferrule that contains at least one optical fiber that terminates at an end face of the ferrule, the ferrule defining at least two guide pin receiving geometries precisely located relative to the at least one optical fiber;

(b) two sleeve body halves joined together, each sleeve body half having a free end through which one of the connectors is inserted and a mating end opposite thereto and defining a passageway therethrough from the free end to the mating end, the two sleeve body halves joined to each other at the mating ends so as to align the passageways with a common longitudinal axis;

(c) a guide pin mount disposed between the mating ends of the sleeve body halves, the guide pin mount defining an opening so as not to obstruct the mating of opposed end faces of connectors therethrough; and (d) at least two guide pins mounted on the guide pin mount and extending from each side of the guide pin mount in a direction parallel with the passageway such that the ends of the guide pins will be received by the guide pin receiving geometries of the optical fiber connectors when the two optical fiber connectors are inserted into the sockets.

11. An adapter for removably receiving at least one optical fiber connector in an operative coupled relationship with another connector or other component, the at least one connector having a ferrule that contains at least one optical fiber that terminates at an end face of the ferrule, the ferrule defining at least two guide pin receiving geometries precisely located relative to the at least one optical fiber, the adapter comprising:
 (a) a sleeve body half having a free end defining a socket into which a connector is insertable and a mating end opposite thereto and defining a passageway therethrough from the free end to the mating end, the mating end having a mating surface perpendicular to the passageway and suitable for joining against another surface, the mating surface having a recessed shoulder at the passageway, the shoulder in a plane parallel with the mating surface (b) a guide pin mount that is generally planar having a portion disposed against the shoulder of the mating surface, the guide pin mount defining an opening so as not to obstruct the mating of opposed end faces of connectors therethrough; and (c) at least two guide pins mounted on the guide pin mount and extending from at least one side of the guide pin mount in a direction parallel with the passageway such that the ends of the guide pins will be received by the guide pin receiving geometries of the optical fiber connector when the optical fiber connector is inserted into the socket.

* * * * *